Figure 1:
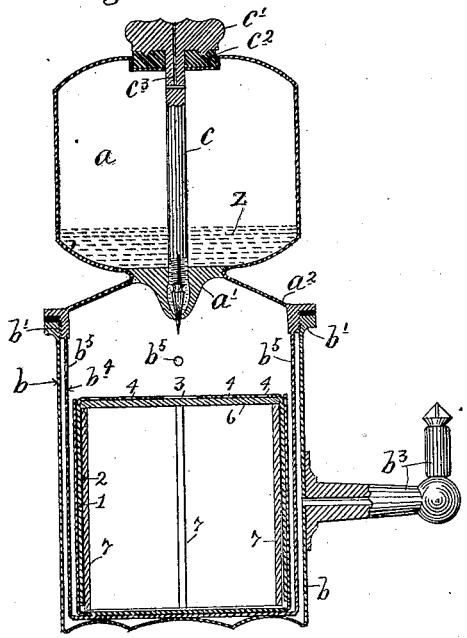

No. 677,936. Patented July 9, 1901.
L. S. BUFFINGTON.
EXPANSIBLE CARBID CARTRIDGE FOR ACETYLENE GAS GENERATORS.
(Application filed Sept. 10, 1897.)
(No Model.)

Witnesses.
A. U. Opvahl.
C. F. Kilgore.

Inventor
Leroy S. Buffington
By his Attorney.
Jas. F. Williamson

THE NORRIS PETERS CO., PHOTO-LITHO., WASHINGTON, D. C.

UNITED STATES PATENT OFFICE.

LEROY S. BUFFINGTON, OF MINNEAPOLIS, MINNESOTA, ASSIGNOR TO THE BUFFINGTON LIGHT CO., OF WEST VIRGINIA.

EXPANSIBLE CARBID-CARTRIDGE FOR ACETYLENE-GAS GENERATORS.

SPECIFICATION forming part of Letters Patent No. 677,936, dated July 9, 1901.

Application filed September 10, 1897. Serial No. 651,159. (No model.)

*To all whom it may concern:*

Be it known that I, LEROY S. BUFFINGTON, a citizen of the United States, residing at Minneapolis, in the county of Hennepin and State of Minnesota, have invented certain new and useful Improvements in Expansible Carbid-Cartridges; and I do hereby declare the following to be a full, clear, and exact description of the invention, such as will enable others skilled in the art to which it appertains to make and use the same.

My invention relates to charge-holders adapted to be preloaded with carbid and then to be handled as cartridges for use in acetylene-gas lamps or other generators. Several of the features of construction disclosed in this application have been disclosed and broadly claimed in certain of my prior patents and certain of my earlier-filed pending applications. I was the first to employ absorbent material for taking up the feed-water and distributing the same in a finely-divided condition to the carbid, and this feature was first disclosed and is broadly claimed in my Patent No. 621,217, of date March 14, 1899. I was also the first to so employ an absorbent material in direct and extended contact with the carbid, and this improvement is disclosed and broadly claimed in my pending application, Serial No. 642,591, filed June 28, 1897. I was also the first to disclose any form of yielding device for holding the carbid and residue in a compact body while permitting the same to expand under the reaction caused in the generating action, and this feature was first disclosed and is broadly claimed in my said pending application, Serial No. 642,591, filed June 28, 1897. I was also the first to disclose any form of expansible charge-holders adapted to be preloaded with carbid and then to be handled as cartridges for use in acetylene-gas lamps or other generators, and this feature was also first disclosed and is broadly claimed in my said pending application, Serial No. 642,591, filed June 28, 1897. I was also the first to disclose expansible charge-holders adapted for such use as cartridges, with the same constructed in the form of two telescoping cups, and this feature is disclosed and claimed in my pending application, Serial No. 651,158, filed as a companion case with the present application September 10, 1897.

The object of my present invention is to provide certain features of improvement, which will be hereinafter described, and defined in the claims.

The invention is illustrated in the accompanying drawings, wherein like characters indicate like parts throughout the several views.

Figure 3:
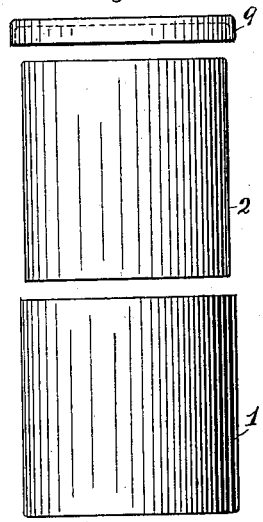
Figure 2:
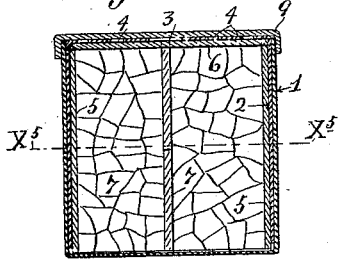
Figure 4:
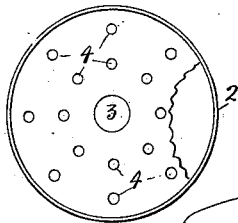
Figure 6:
Figure 5:
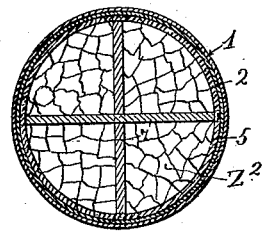
Figure 7:
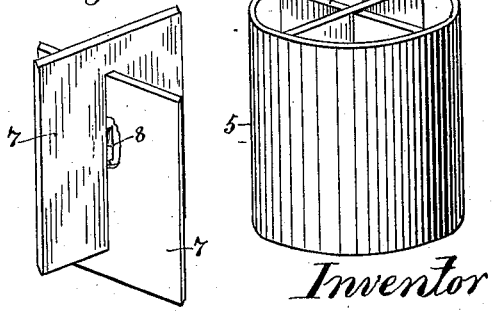

Figure 1 is a view, principally in vertical section, but with some parts in full, showing an acetylene-gas generator in the form of a bicycle-lamp with one of my improved carbid cartridges or packages contained in the generating-chamber thereof. Fig. 2 is a central longitudinal section of my improved cartridge shown as in condition for shipment or storage. Fig. 3 is a view in side elevation, showing the parts of the cartridge or shell separated or drawn apart. Fig. 4 is a plan view of the cartridge or shell with the sealing cap or section removed and some parts broken away. Fig. 5 is a horizontal section taken on the line $x^5$ $x^5$ of Fig. 2. Fig. 6 is a perspective view of the absorbent filling or lining removed from the cartridge or shell, and Fig. 7 is a perspective view of the vertical partition-plates removed from the parts shown in Fig. 6 and partially drawn apart.

The bicycle-lamp shown in the accompanying drawings is shown simply to illustrate how the cartridge or expansible shell will serve its function as a carbid-holder in the generating action, and hence the parts of said lamp may be briefly noted.

$a$ indicates a bulb-like water-containing vessel which is provided in its bottom with a valve-seat casting $a'$ and with a depending screw-threaded flange $a^2$. The generating chamber or vessel $b$ is removably secured to the flange $a^2$ by screw-threaded engagement therewith, as shown at $b'$. A burner $b^3$ opens from the vessel $b$.

$b^4$ indicates a cylindrical cup which is placed within the generating-chamber $b$ and is provided with perforations $b^5$ to permit of the free passage of the gas. A needle-valve $c$ opens and closes a water-escape passage in the casting $a'$ to control the feed of the water $z$ from said bulb $a$ into the generating-chamber $b$. The valve $c$ is provided with a head $c'$ outside of the bulb $a$, which works against an elastic washer $c^2$, which frictionally holds the valve wherever set. A small air-passage $c^3$ in the valve $c$ permits atmospheric pressure within the water-bulb $a$.

As already indicated, the body of the cartridge or shell is made up of a pair of cup-like or cylindrical telescopically-connected sections 1 and 2. As shown, the inner section 2 is provided with a large central perforation 3 and with a multiplicity of smaller perforations 4 in its head or upper end. In this preferred construction the cartridge-section 2 is provided with a cylindrical lining 5 and with a disk-like lining 6, which covers the inner surface of its head or upper end. The parts 5 and 6 are formed of some suitable absorbent material, preferably of blotting-paper. Within the cylindrical lining 5 is a pair of vertical partitions or cross-plates 7, which are provided with slots 8, cut half their length, so as to permit said plates to straddle each other and stand at right angles, as best shown in Fig. 5. These partitions or cross-plates 7 are also constructed of absorbent material, preferably of blotting-paper. The upper open end of the outer cartridge-section 1 is closed by means of a sealing cap or cover 9, which also covers and closes the perforations 3 and 4 in the head of the section 2. This sealing cap or cover 9 is preferably constructed of cardboard or heavy paper, which is saturated and coated with paraffin to make the same impervious to moisture.

$z^2$ indicates carbid contained within the cartridge or shell.

The cartridge above described is adapted to be placed in the generating-chamber of the bicycle-lamp, as illustrated in the accompanying drawings in Fig. 1, by reference to which it will be noted that the central perforation 3 stands immediately under the needle-point of the valve $c$, so that when said valve is open the water $z$ from the water-bulb $a$ will drop through said perforation 3 onto the disk 6 of absorbent or blotting material. The sealing-cap 9 must of course either be removed from the cartridge or perforated above the perforation or passage 3 before the said cartridge is placed within the generator. The water which is dropped onto the absorbent disk 6 will be conducted by capillary attraction first to and then through the cylindrical lining 5 and cross-plates 7. In this manner the water will be conducted around and through the body of carbid within the cartridge, so that the distance which the water must soak through the lime products in order to reach the most remote particles of carbid will be very short. By this manner of conducting the water to the carbid by an absorbent material all impulses in the generating action are prevented.

Under the generating action above described the increasing bulk of the lime products will cause the sections 1 and 2 of the cartridge or shell to move telescopically with respect to each other or, in other words, to expand the cartridge or shell to give the required increased holding capacity to the cartridge. It will thus be seen that the cartridge or shell serves not only as a waterproof package for the delivery or shipment of the carbid, but when placed in the generator serves also as an expansible carbid-holder.

The shells of the cartridge are preferably made from thin sheet-iron or other cheap metal, but can of course be made of any suitable material adapted to the purpose. It should be some material extremely cheap. Hence when the carbid has been used up or generated the cartridge or shell, with the lime residue which it contains, may be removed from the generator and thrown away.

It will be understood that various alterations in the specific details of construction above described may be made without departing from the spirit of my invention.

It is of course obvious that in respect to the feature as to the disposition of the absorbent material within the cartridge as herein disclosed it is immaterial whether or not the shell be made up of telescoping cups or not. Some provision would probably have to be made to permit the increase of bulk when the cartridge should be applied for use within the lamp or other generator; but said special disposition of the absorbent material within the charge-holder as herein disclosed is of itself new, regardless of the form of the shell of the charge-holder itself. It should be especially noted that the absorbent material is in direct and extended contact with the carbid and across the line of the water-feed thereto when the cartridge is placed in working position. The cartridge herein disclosed is adapted to be hermetically sealed and afford an air and water proof package for storage or shipment, thereby avoiding the waste of the carbid or the deterioration thereof until the cartridge is put into use.

What I claim, and desire to secure by Letters Patent of the United States, is as follows:

1. A carbid-cartridge comprising a body of broken or pulverized carbid, a core consisting of a plate or plates of absorbent material within the mass of the carbid and dividing it into smaller bodies, and an absorbent plate in position to receive the water and transmit it to the core plate or plates, when the cartridge is placed in a generating-chamber, the whole being put up within an inclosing case or shell and rendered impervious to moisture until brought into use.

2. A charge-holder, for use in an acetylene lamp or other generator, composed of an expansible shell and a body of broken or pulverized carbid, and a series of plates of absorbent material within the mass of the carbid, and subdividing the same into smaller bodies, with said absorbent material disposed across the water-feed inlet, which charge-holder is adapted to be hermetically sealed, and affords an air and water proof cartridge, for use substantially as described.

3. As a new article of manufacture, a charge-holder for use in an acetylene-gas lamp or other generator, composed of a pair of telescoping cups containing carbid and a body of absorbent material disposed within the carbid in the form of a series of plates, which subdivide the mass of carbid into smaller bodies, with the absorbent material in direct contact with the carbid and across the water-inlet thereto, which charge-holder is adapted to be hermetically sealed and to afford an air and water proof cartridge, for use substantially as described.

In testimony whereof I affix my signature in presence of two witnesses.

LEROY S. BUFFINGTON.

Witnesses:
LILLIAN C. ELMORE,
F. D. MERCHANT.